United States Patent [19]

Penley

[11] Patent Number: 5,787,562
[45] Date of Patent: Aug. 4, 1998

[54] QUICK REPLACEMENT SEAT BOTTOM DIAPHRAGM AND METHOD

[75] Inventor: James Randall Penley, Pfafftown, N.C.

[73] Assignee: Burns Aerospace Corporation, Winston-Salem, N.C.

[21] Appl. No.: 878,784

[22] Filed: Jun. 19, 1997

Related U.S. Application Data

[62] Division of Ser. No. 410,777, Mar. 27, 1995.

[51] Int. Cl.⁶ .................... B23P 6/00; A47C 7/00
[52] U.S. Cl. .................. 29/402.08; 29/446; 29/426.1; 297/440.11
[58] Field of Search .................... 29/426.1, 428, 29/402.3, 402.08, 446; 297/440.11, 440.1, DIG. 6, 440.22, 440.2, 219.1, 218.1, 218.4

[56] References Cited

U.S. PATENT DOCUMENTS

| | | |
|---|---|---|
| 4,099,780 | 7/1978 | Schmidhuber . |
| 4,375,300 | 3/1983 | Long et al. . |
| 4,910,817 | 3/1990 | Kita . |
| 5,013,089 | 5/1991 | Abu-Isa et al. . |
| 5,088,747 | 2/1992 | Morrison et al. . |
| 5,284,379 | 2/1994 | Arnold et al. . |
| 5,378,040 | 1/1995 | Chaney et al. . |
| 5,378,045 | 1/1995 | Siekman et al. . |
| 5,393,126 | 2/1995 | Boulva . |
| 5,439,271 | 8/1995 | Ryan . |
| 5,476,308 | 12/1995 | St. Germain . |
| 5,553,923 | 9/1996 | Bilezikjian . |

*Primary Examiner*—Milton Nelson, Jr.
*Attorney, Agent, or Firm*—Adams Law Firm, P.A.

[57] ABSTRACT

A passenger seat with a quick replacement seat bottom diaphragm, comprising a seat frame assembly, including legs for securing the seat to a deck of a vehicle, and a seat bottom frame and a seat back frame carried by the legs in vertically-spaced relation to the deck. The seat bottom frame includes first and second laterally-spaced seat bottom frame members extending from the seat back forward to a position adjacent the knee area of a seat occupant. A seat bottom diaphragm assembly is provided for attachment to the seat bottom frame for supporting a seat bottom cushion. The seat bottom diaphragm assembly comprises fore and aft brackets carried by each of the first and second seat bottom frame members, and fore and aft diaphragm stretcher bars extending laterally across the seat bottom for being locked into the fore and aft brackets of the first and second seat bottom frame members. A seat bottom diaphragm having fore and aft attachment members is provided for being quickly attached to and detached from respective fore and aft stretcher bars. The seat bottom diaphragm has an untensioned fore to aft dimension when not attached to the stretcher bars which is less than the distance between the fore and aft stretcher bars, and a tensioned fore to aft dimension when attached to the stretcher bars sufficient to provide adequate seat bottom support for the seat occupant.

2 Claims, 6 Drawing Sheets

QUICK REPLACEMENT SEAT BOTTOM DIAPHRAGM AND METHOD

This application is a division of application Ser. No. 08/410,777, filed on Mar. 27, 1995.

TECHNICAL FIELD AND BACKGROUND OF THE INVENTION

This invention relates to a quick replacement seat bottom diaphragm and method. The particular embodiment of the invention disclosed in this application is intended for use in connection with an aircraft passenger seat, particularly a high density coach-class seat which is typically part of a two or three seat unit called a "seat set." The invention has application in any type of passenger seat which is intended to be covered by a cushion. Typical seat bottom diaphragms comprise metal plates which are attached by bolts to the seat bottom frame portion of the seat frame. The diaphragm may include inserts, and may be in two or more pieces to accommodate other components, such as seat adjustment mechanisms. If damaged or otherwise needing replacement, such metal diaphragms must be removed by first removing screws, bolts or other fasteners by which the diaphragm is attached to the seat bottom frame. Then, the new diaphragm is installed by fitting the diaphragm into the proper position and then reattaching the fasteners. This procedure is relatively time-consuming and sometimes requires specialized tools. For this reason, such changes cannot typically be made during "turn around" maintenance while the aircraft is in service, but during interval maintenance when the aircraft is out of service.

Metal diaphragms are also relatively expensive since they are fabricated of aircraft grade aluminum and are typically made using several metal-forming steps such as cutting, bending, and drilling and/or tapping. The diaphragm must be substantially rigid and must support considerable weight, since it is the only seat bottom support provided. The overlying cushion is provided for comfort and appearance, and offers little structural support to the seat or the occupant.

The prior art includes folding "directors' chairs" which have a fabric bottom. However, the fabric seat bottom is intentionally wider than the width of seat from side-to-side in order to provide a curved contour to the seat bottom. In addition, the channels by which the fabric seat bottom is attached to the chair run from front-to-back, not side-to-side as in the diaphragm disclosed below.

The prior art also discloses military-type webbing-covered bench seating which runs the length of the passenger compartment of military aircraft such as C-141s. Typically, these benches face each other approximately 2 feet apart, so that the occupants face each other when seated. The fabric seat is attached in long lengths encompassing several seats and is permanently attached to the seat frame. The fabric comprises the seating surface itself rather than a support for an overlying cushion. The fabric is supported between fore and aft rails which extend the length of numerous side-by-side seats. When not in use, the seat bottom folds up against the seat back to permit ease of ingress and egress.

The present invention relates to a diaphragm which may be fabricated of fabric or other suitable web material. It is designed to be inexpensive, easy to fabricate, durable, lightweight, and easy and quick to remove and replace.

SUMMARY OF THE INVENTION

Therefore, it is an object of the invention to provide a quick replacement seat bottom diaphragm and method for installing and removing a diaphragm from a passenger seat such as an aircraft passenger seat.

It is another object of the invention to provide a seat bottom diaphragm which is inexpensive.

It is another object of the invention to provide a seat bottom diaphragm which is easy to fabricate.

It is another object of the invention to provide a seat bottom diaphragm which is durable.

It is another object of the invention to provide a seat bottom diaphragm which is lightweight.

It is another object of the invention to provide a seat bottom diaphragm which can be removed and replaced with many types of simple tools, such as screwdrivers, crowbars, wrenches or any other long, rigid object.

It is another object of the invention to provide a seat bottom diaphragm which is flexible, but which when installed under tension becomes sufficiently rigid to support the weight of the occupant.

It is another object of the invention to provide a seat bottom diaphragm which can be quickly removed and replaced during aircraft "turn-around".

These and other objects of the present invention are achieved in the preferred embodiments disclosed below by providing a passenger seat with a quick replacement seat bottom diaphragm, comprising a seat frame assembly, including legs for securing the seat to a deck of a vehicle, and a seat bottom frame and a seat back frame carried by the legs in vertically-spaced relation to the deck. The seat bottom frame includes first and second laterally-spaced seat bottom frame members extending from the seat back forward to a position adjacent the knee area of a seat occupant. A seat bottom diaphragm assembly is provided for attachment to the seat bottom frame for supporting a seat bottom cushion. The seat bottom diaphragm assembly comprises fore and aft brackets carried by each of the first and second seat bottom frame members, and fore and aft diaphragm stretcher bars extending laterally across the seat bottom for being locked into the fore and aft brackets of the first and second seat bottom frame members. A seat bottom diaphragm having fore and aft attachment members is provided for being quickly attached to and detached from respective fore and aft stretcher bars. The seat bottom diaphragm has an untensioned fore to aft dimension when not attached to the stretcher bars which is less than the distance between the fore and aft stretcher bars, and a tensioned fore to aft dimension when attached to the stretcher bars sufficient to provide adequate seat bottom support for the seat occupant.

According to one preferred embodiment of the invention, the seat bottom diaphragm comprises a web which is flexible when not under tension and which under tension becomes substantially inflexible. Preferably, the web comprises a woven fabric.

According to another preferred embodiment of the invention, the fore and aft attachment members comprise channels for receiving the respective fore and aft stretcher bars therethrough. Preferably, the channels are integrally formed with the diaphragm.

According to yet another preferred embodiment of the invention, the diaphragm comprises a woven fabric material, and the attachment members comprise channels integrally formed in the woven fabric for receiving the respective fore and aft stretcher bars therethrough.

According to yet another preferred embodiment of the invention, the channels comprise a single fore channel and a single aft channel, the fore and aft channels extending the entire widthwise dimension of the diaphragm from one side of the seat bottom frame to the other.

According to yet another preferred embodiment of the invention, the stretcher bars are round in cross-section, and the brackets each comprise a C-shaped member defining an arcuate surface having an arc corresponding to an arc of the cross-section of the stretcher bar for receiving and locking the diaphragm into its tensioned position on the seat frame.

According to yet another preferred embodiment of the invention, the C-shaped members each define an access opening for receiving respective stretcher bars. The access openings of the aft brackets are oriented towards the rear of the seat bottom frame and the fore brackets are oriented towards the front of the seat bottom frame for mutually cooperating to maintain tension on the seat bottom diaphragm by maintaining the stretcher bars in a fixed position in relation to each other.

According to yet another preferred embodiment of the invention, the channels are formed of woven material of the diaphragm. The woven material is turned onto itself to form a channel and secured with at least one row of sewing stitches.

According to yet another preferred embodiment of the invention, the seat includes at least one seat bottom cushion attachment member carried one major surface of the seat bottom diaphragm for securing a seat bottom cushion to the seat bottom diaphragm.

According to yet another preferred embodiment of the invention, the at least one cushion attachment member comprises a touch fastener member for cooperating with a complementary, mating touch fastener member carried on the seat bottom cushion.

A method of replacing a seat bottom diaphragm according to the invention comprises the steps of providing a seat frame assembly, including legs for securing the seat to a deck of a vehicle, and a seat bottom frame and a seat back frame carried by the legs in vertically-spaced relation to the deck. The seat bottom frame includes first and second laterally-spaced seat bottom frame members extending from the seat back forward to a position adjacent the knee area of a seat occupant. A seat bottom diaphragm assembly is provided for attachment to the seat bottom frame for supporting a seat bottom cushion. The seat bottom diaphragm assembly includes fore and aft brackets carried by each of the first and second seat bottom frame members and fore and aft diaphragm stretcher bars extending laterally across the seat bottom for being locked into the fore and aft brackets of the first and a second seat bottom frame members. A seat bottom diaphragm having fore and aft attachment members is provided for being quickly attached to and detached from respective fore and aft stretcher bars, the seat bottom diaphragm having an untensioned fore to aft dimension when not attached to the stretcher bars which is less than the distance between the fore and aft stretcher bars, and a tensioned fore to aft dimension when attached to the stretcher bars sufficient to provide adequate seat bottom support for the seat occupant. The method also includes the steps of removing one of the for and aft stretcher bars from its respective bracket to release tension on the diaphragm, and then removing the other of the fore and aft stretcher bars from its respective bracket to permit removal of the diaphragm from the seat frame. The diaphragm is removed from the stretcher bars by detaching the attachment members of the diaphragm from the stretcher bars and the diaphragm removed from the stretcher bars is replaced with another diaphragm. One and then the other of the fore and aft stretcher bars are secured onto the brackets of the seat frame bottom frame members thereby tensioning the diaphragm between the stretcher bars.

According to one preferred embodiment of the invention, the stretcher bars are round in cross-section, and the brackets each comprise a C-shaped member defining an arcuate surface having an arc corresponding to an arc of the cross-section of the stretcher bar for securing receiving and locking the diaphragm into its tensioned position on the seat frame. The method includes the step of securing one and then the other of the fore and aft stretcher bars onto the brackets of the seat frame bottom frame members thereby tensioning the diaphragm between the stretcher bars comprises locking the stretcher bars into the C-shaped members.

BRIEF DESCRIPTION OF THE DRAWING

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
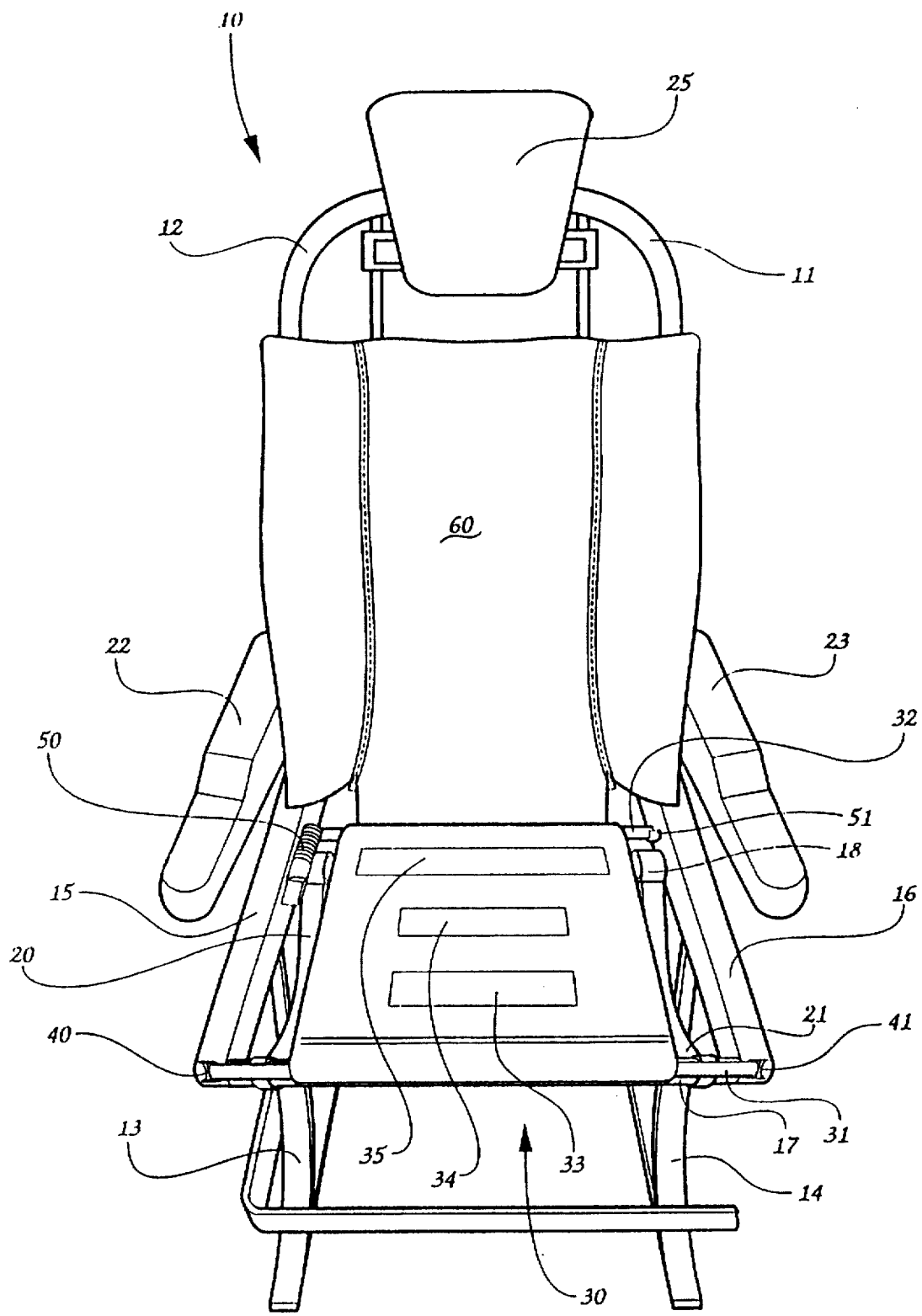
FIG. 1 is a simplified front perspective view of an aircraft passenger seat with a seat bottom diaphragm according to the preferred embodiment of the invention.

Referring now specifically to the drawings, a aircraft passenger seat which includes a diaphragm seat bottom according to the present invention is illustrated in FIG. 1 and shown generally at reference numeral 10. The seat 10 includes a seat frame 11 which includes a seat back frame 12, left and right (facing as in FIG. 1) pairs of legs 13 and 14 by which the seat 10 is secured to the deck of the aircraft, and a seat bottom frame which comprises a pair of left and right seat bottom frame members 15 and 16.

Fore and aft seat frame tubes 17 and 18 are mounted in tube brackets 20 and 21 and provide further support to the seat bottom frame members 15 and 16. Tubes 17 and 18 also connect together two or more seats 10 to form a "seat set" of seats for unitary installation in an aircraft passenger cabin.

Arm rests 22 and 23 are carried by the left and right seat bottom frame members 15 and 16. The seat back frame 12 carries an adjustable headrest 25.

As is also shown broadly in FIG. 1, a seat bottom diaphragm 30 is mounted on fore and aft stretcher bars 31 and 32 and provides a support surface for an upholstered cushion (not shown). Spaced strips of touch fasteners 33, 34, and 35, also called "hook and loop" material, is sewn or otherwise suitably attached to the top surface. The fasteners may be male or female to mate with complementary fasteners on the underside of a seat bottom cushion (not-shown). In the preferred embodiment shown in the figures, the fastener strips 33 and 34 have loop material for mating with male hooks on the underside of the seat bottom cushion (not shown), and strip 35 has male hooks for mating with female loops on the underside of the seat bottom cushion. Hermaphroditic fasteners such as "mushroom" or "Christmas tree" fasteners, or any other suitable fastener assembly may also be used.

Likewise, a strip 35A of male or female hook and loop material is sewn to the aft end of the diaphragm 30 and is used to interconnect the diaphragm 30 with a seat back structure, shown generally at 60, which carries a complementary strip of hook and loop material, not shown, on its lower end.

Figure 2:
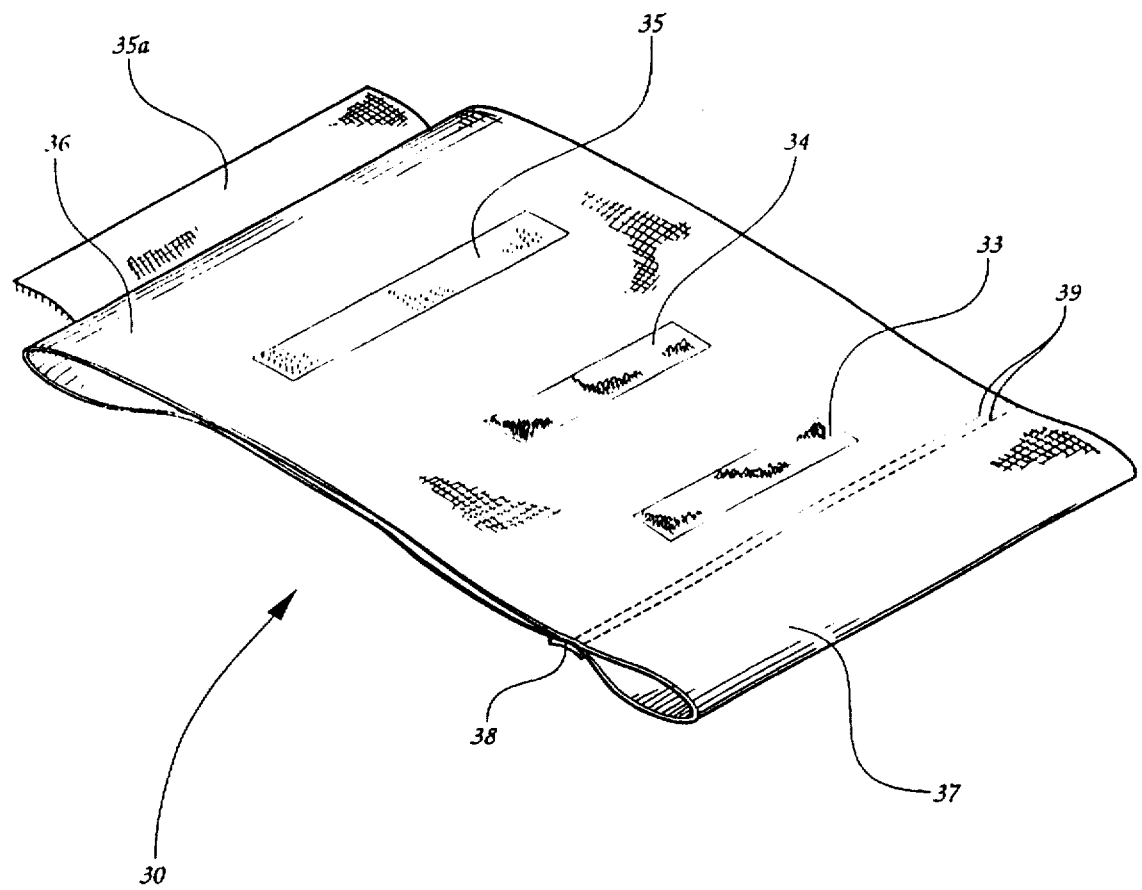
FIG. 2 is a perspective view of a seat bottom diaphragm according to the present invention.

As is shown in more detail in FIG. 2, seat bottom diaphragm 30 is formed of a densely-woven fabric web which is folded over itself on opposite ends to form the fabric web into a tubular structure. Rows of sewing stitches 39 connect overlapped opposite ends of the fabric web to fix the fabric web into its tubular form, and separate the tubular structure into two channels 36 and 37. In the preferred embodiment of the invention, six rows of lock-stitches 39, with back stitching for further strength, extend from side to side across the fabric web. Further strength is added by reenforcing the seam with a woven backing tape 38 applied to the back side of the diaphragm 30 and overlapping the seam formed by the rows of stitches 39. The precise number of rows 15 of stitches used, the stitches per inch and similar variables can be selected by those skilled in the art to provide optimum results for a given construction. In the preferred embodiment, 7 lock stitches per inch are used.

In a preferred embodiment of the invention, the seat bottom diaphragm 30 is fabricated of DuPont Dymetrol 200, a nylon-based fiber woven into a dense fabric. The fabric is engineered to withstand 9 G's in a static load test.

In accordance with a preferred embodiment of the invention, the diaphragm 30 has is a woven fabric with 40 warp ends and 27 picks per inch.

Figure 3:
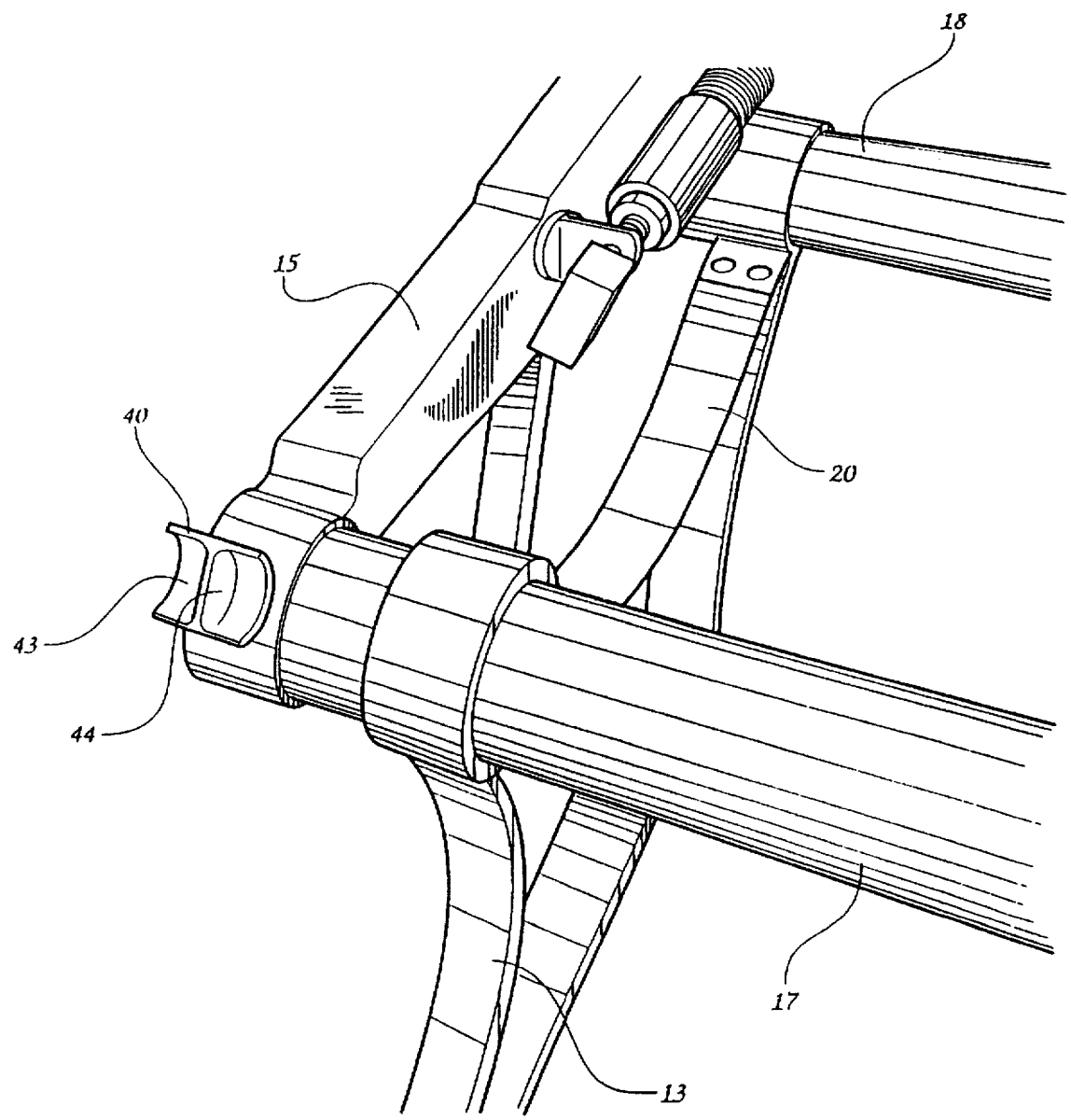
FIG. 3 is a fragmentary enlarged perspective view of one of the fore stretcher bar brackets according to the preferred embodiment of the present invention.

Referring now to FIG. 3, the fore stretcher bar bracket 40 is shown in detail. The fore stretcher bar 31 is mounted in bracket 40 and an identical bracket 41 (FIG. 1). Brackets 40 and 41 are integrally formed on the forward ends of respective seat bottom frame members 15 and 16. As is shown in FIG. 3, bracket 40 defines a C-shaped member 43. Member 43 is oriented to the front of the seat 10 and at a slight upward angle, and receives the end of the stretcher bar 31. Member 43 has a radius which matches the radius of the stretcher bar 31, and thus provides a secure, stationary fit. Member 43 is divided by a vertical partition web 44 which provides lateral support to and prevents lateral shifting of the stretcher bar 31. As noted above, bracket 41 is identical to bracket 40 and functions identically.

When the fore stretcher bar 31 is properly positioned in the brackets 40 and 41 it cooperates with aft stretcher bar 32 to tension the seat bottom diaphragm 30.

Figure 4:
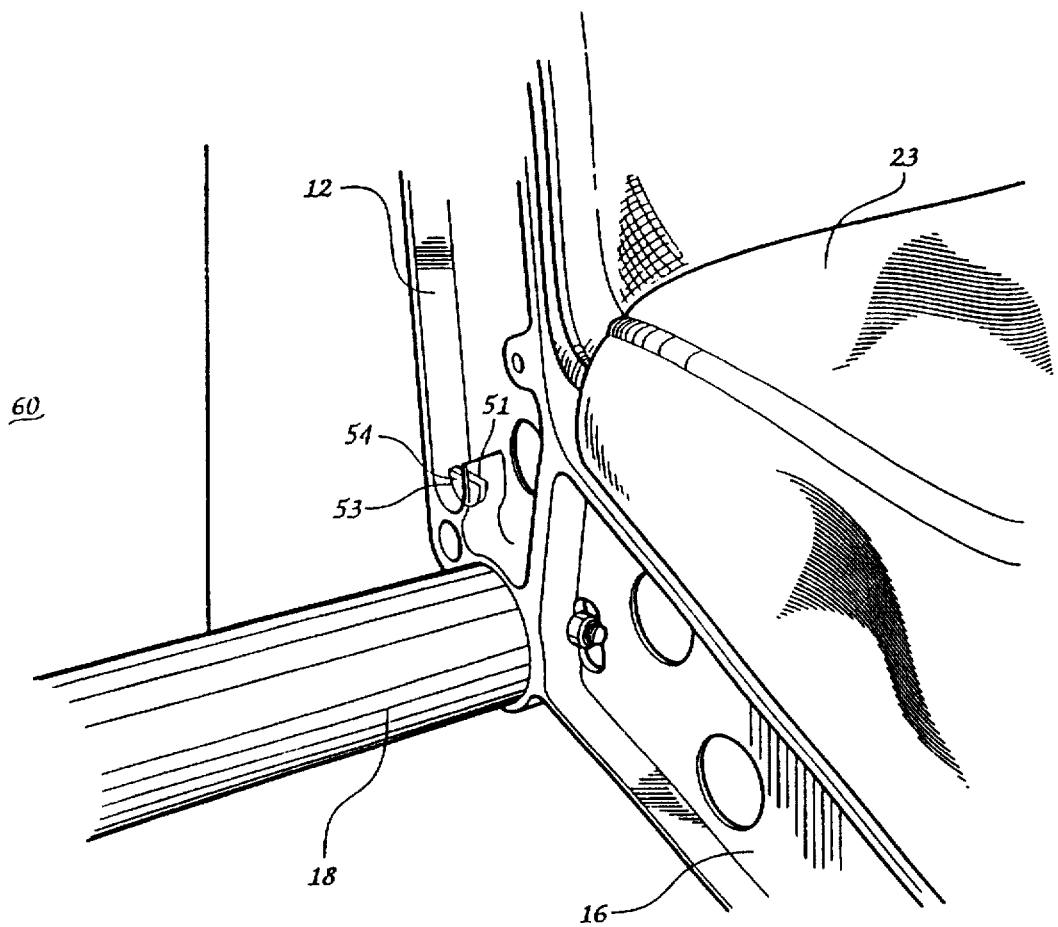
FIG. 4 is a fragmentary enlarged perspective view of one of the aft stretcher bar brackets according to the preferred embodiment of the present invention.

Referring now to FIG. 4, aft stretcher bar 32 is held in brackets 50 and 51 integrally formed on the rearward ends of respective seat bottom frame members 15 and 16 below the rear of the armrests 22 and 23. As is shown in FIG. 3, bracket 51 defines a C-shaped member 53. Member 53 is oriented to the rear of the seat 10 and at a slight upward angle, and receives the end of the aft stretcher bar 32. Member 53 has a radius which matches the radius of the stretcher bar 32, and thus provides a secure, stationary fit. Member 53 is divided by a vertical partition web 54 which provides lateral support to and prevents lateral shifting of the stretcher bar 32. As noted above, bracket 50 is identical to bracket 50 and functions identically.

Figure 5:
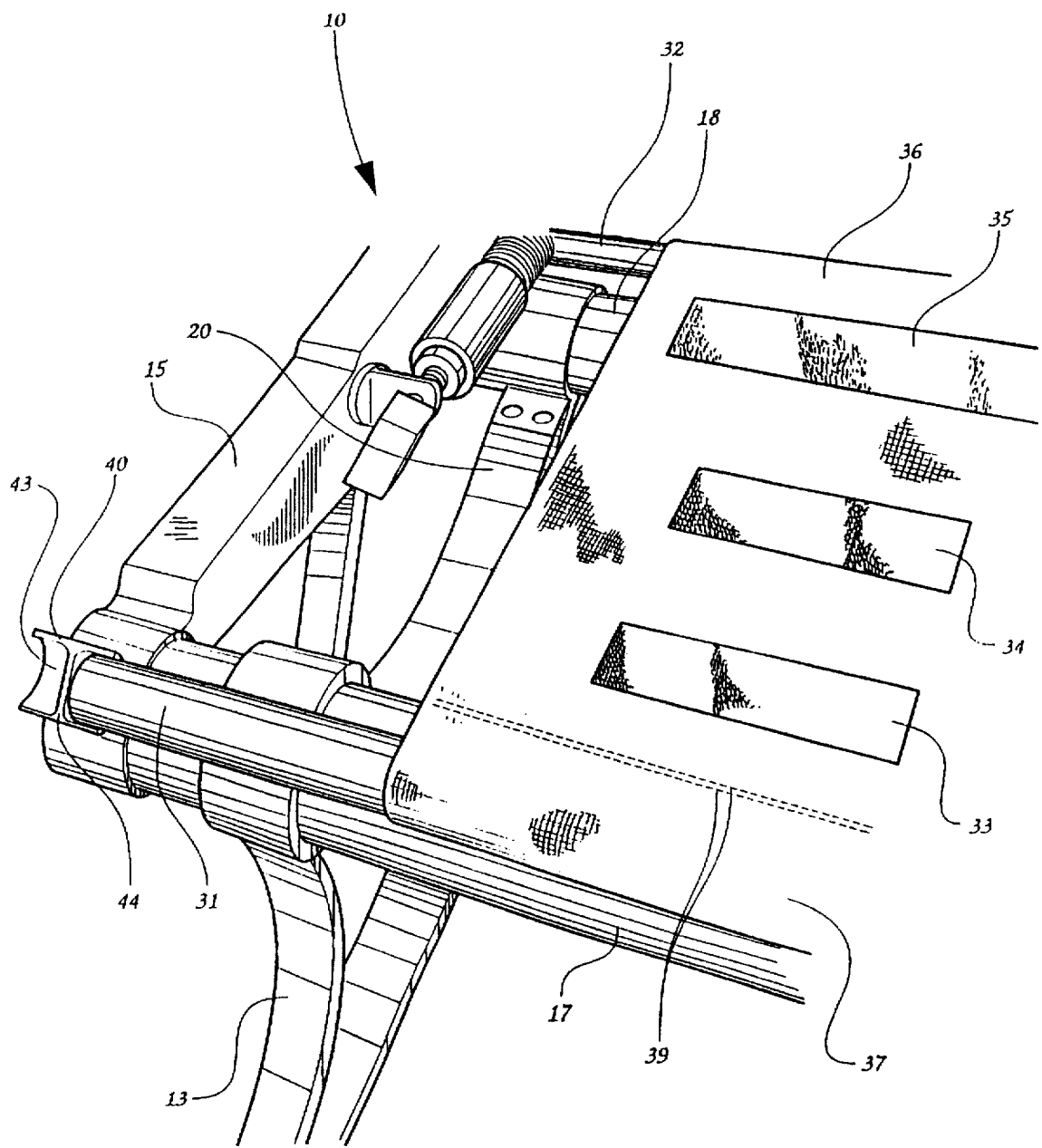
FIG. 5 is a fragmentary enlarged perspective view of one of the fore stretcher bar brackets according to the preferred embodiment of the present invention, showing the seat bottom diaphragm in place.
Figure 6:
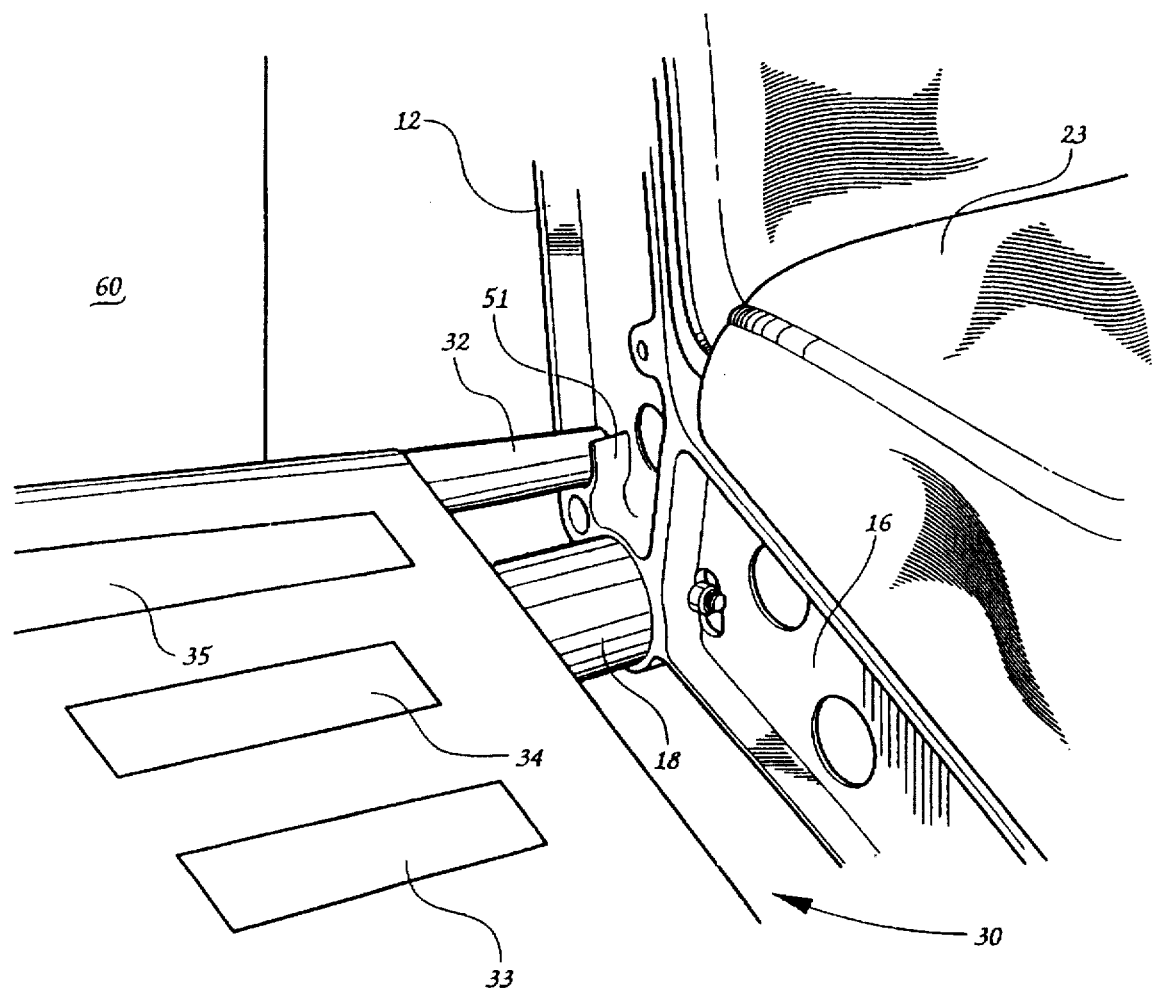
FIG. 6 is a fragmentary enlarged perspective view of one of the aft stretcher bar brackets according to the preferred embodiment of the present invention, showing the seat bottom diaphragm in place.

FIG. 5 shows the fore stretcher bar 31 is shown properly positioned in the bracket 40, while FIG. 6 shows the aft stretcher bar 32 properly positioned in bracket 51. As is shown in FIGS. 1, 5 and 6, and as noted above, stretcher bars 31 and 32 are normally positioned in the fore brackets 40 and 41 and in the aft brackets 50 and 51 and tension the seat bottom diaphragm 30 between them. By way of example, the length of the seat bottom diaphragm 30 from front to back in its uninstalled, untensioned condition is 15.25 inches. The length of the seat bottom diaphragm 30 is such that to install the seat bottom diaphragm 30 on the seat 10, the following procedure is followed:

1. The seat bottom diaphragm 30 is installed on the aft stretcher bar 32 by extending the stretcher bar 32 through the channel 36, so that opposing ends of the stretcher bar 32 protrude from opposing sides of the seat bottom diaphragm 30. The opposing ends of the stretcher bar 32 are then placed in the brackets 50 and 51, as described above. The seat bottom diaphragm 30 is extended forwardly towards the front of the seat 10, and the stretcher bar 31 is extended through the channel 37 on the front end of the seat bottom diaphragm 30. Opposing ends of the stretcher bar 31 protrude from opposing sides of the seat bottom diaphragm 30. The opposing ends of the stretcher bar 31 are then placed in the brackets 40 and 41. This must be done by prying the stretcher bar 31, one end at a time, over the tube 17 with a large screwdriver, crowbar, wrench handle or the like. The tube 17 is used for leverage. Thus, one end of the stretcher bar 31 is pried into place in either of the brackets 40 or 41, and then the other end of the stretcher bar 31 is pried into place in the other of the other brackets 40 or 41. During this process the diaphragm stretches between 3 and 5 percent, and remains tensioned while in position. The additional weight added by the occupant will stretch the diaphragm to about 110% of its untensioned length, with full recovery. In effect, the seat bottom diaphragm 30 becomes rigid, and serves the same purpose as a rigid metal diaphragm. The seat bottom diaphragm 30 has been tested by dropping a 175 pound weight from a distance of one foot above the diaphragm through 50,000 cycles without detectable evidence of wear, and 100,000 cycles without failure of the fabric structure.

When replacement of the seat bottom diaphragm 30 is required, the one end of the fore stretcher bar 31 is pried out of the respective one of the brackets 40 and 41. Once untensioned, the stretcher bar 31 slides easily out of the channel 37. Then the aft stretcher bar 32 is simply lifted out of the brackets 50 and 51, and the seat bottom diaphragm is removed. The fore and aft stretcher bars 31 and 32 are extended though the channels 37 and 36 of the new seat bottom diaphragm 30 and installed as described above.

A quick replacement seat bottom diaphragm and method is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A method of replacing a seat bottom diaphragm of a passenger seat, comprising the steps of:
   (a) providing a seat frame assembly, including legs for securing the seat to a deck of a vehicle, and a seat bottom frame and a seat back frame carried by said legs in vertically-spaced relation to the deck, said seat bottom frame including first and second laterally-spaced seat bottom frame members extending forwardly away from the seat back frame;
   (b) providing a seat bottom diaphragm assembly for attachment to said seat bottom frame for supporting a seat bottom cushion, said seat bottom diaphragm assembly including:
      (1) fore and aft brackets carried by each of said first and second seat bottom frame members;
      (2) fore and aft diaphragm stretcher bars extending laterally across the seat bottom frame for being locked into said fore and aft brackets of said first and second seat bottom frame members;
      (3) a seat bottom diaphragm having fore and aft attachment members for being quickly attached to and detached from respective fore and aft stretcher bars, said seat bottom diaphragm having an untensioned fore to aft dimension when not attached to said stretcher bars which is less than the distance between the fore and aft stretcher bars, and a tensioned fore to aft dimension when attached to said stretcher bars sufficient to provide adequate seat bottom support for a seat occupant;
   (c) removing one of said fore and aft stretcher bars from its respective bracket to release tension on said diaphragm;
   (d) removing the other of said fore and aft stretcher bars from its respective bracket to permit removal of the diaphragm from the seat bottom frame;
   (e) removing the diaphragm from the stretcher bars by detaching the attachment members of the diaphragm from the stretcher bars;
   (f) replacing the diaphragm removed from the stretcher bars with another diaphragm;
   (g) securing one and then the other of the fore and aft stretcher bars onto the brackets of the seat frame bottom frame members thereby tensioning the diaphragm between the stretcher bars.

2. A method according to claim 1, wherein said stretcher bars are round in cross-section, and said brackets each comprise a C-shaped member defining an arcuate surface having an arc corresponding to an arc of the cross-section of the stretcher bar for securing, receiving and locking the diaphragm into its tensioned position on the seat bottom frame, and the step of securing one and then the other of the fore and aft stretcher bars onto the brackets of the seat frame bottom frame members thereby tensioning the diaphragm between the stretcher bars comprises locking the stretcher bars into the C-shaped members.

* * * * *